United States Patent
Dutton et al.

(10) Patent No.: US 10,195,917 B2
(45) Date of Patent: Feb. 5, 2019

(54) JOUNCE BUMPER

(71) Applicant: Vibracoustic North America, L.P., Farmington Hills, MI (US)

(72) Inventors: Lee Hayden Dutton, Manchester, NH (US); Mickey L. Love, Londonderry, NH (US)

(73) Assignee: Vibracoustic North America, L.P., Farmington Hills, MI (US)

( * ) Notice: Subject to any disclaimer, the term of this patent is extended or adjusted under 35 U.S.C. 154(b) by 0 days.

(21) Appl. No.: 15/052,191

(22) Filed: Feb. 24, 2016

(65) Prior Publication Data
US 2016/0243914 A1  Aug. 25, 2016

Related U.S. Application Data

(60) Provisional application No. 62/119,885, filed on Feb. 24, 2015.

(51) Int. Cl.
| | | |
|---|---|---|
| F16F 1/44 | (2006.01) | |
| B60G 11/54 | (2006.01) | |
| B60G 15/06 | (2006.01) | |
| F16F 1/373 | (2006.01) | |

(52) U.S. Cl.
CPC .............. B60G 15/06 (2013.01); B60G 11/54 (2013.01); F16F 1/373 (2013.01); F16F 1/44 (2013.01); B60G 2204/4502 (2013.01); B60G 2206/42 (2013.01); B60G 2500/22 (2013.01)

(58) Field of Classification Search
CPC .... B60G 15/06; B60G 11/22; B60G 2202/32; B60G 2206/42; B60G 2206/73; B60G 11/54; F16F 1/373; F16F 1/44

USPC ...... 267/220, 219, 64.11, 64.13, 64.15, 140; 188/322.12; 280/124.155
See application file for complete search history.

(56) References Cited

U.S. PATENT DOCUMENTS

| | | | | |
|---|---|---|---|---|
| 3,346,272 A | | 10/1967 | Smith | |
| 4,828,232 A | * | 5/1989 | Harrod | ...................... F16F 9/58 |
| | | | | 188/322.12 |
| 5,467,971 A | * | 11/1995 | Hurtubise | ............ B60G 15/068 |
| | | | | 188/322.12 |

(Continued)

FOREIGN PATENT DOCUMENTS

| | | |
|---|---|---|
| CH | 569 205 | 11/1975 |
| DE | 20 2004 000 624 U1 | 4/2004 |

(Continued)

OTHER PUBLICATIONS

International Search Report dated Jun. 21, 2016, International Application No. PCT/US2016/019320, filed Feb. 24, 2016.

*Primary Examiner* — Pamela Rodriguez
(74) *Attorney, Agent, or Firm* — Varnum, Riddering, Schmidt & Howlett, LLP

(57) ABSTRACT

A jounce bumper for mounting in a vehicle suspension system having a bore extending therethrough, the bore configured to receive the piston rod, a nose having a predetermined inner diameter and a predetermined outer diameter, the nose being generally spherical or elliptical shaped and an undercut within the jounce bumper in the bore of the jounce bumper, the undercut creating an ununiformed thickness between the predetermined inner diameter and the predetermined outer diameter so as to provide improved handling characteristics of the jounce bumper.

17 Claims, 4 Drawing Sheets

(56) References Cited

U.S. PATENT DOCUMENTS

| | | | | |
|---|---|---|---|---|
| 5,901,947 | A | * | 5/1999 | Fotino .................. F16F 9/38 |
| | | | | 267/195 |
| 7,837,182 | B2 | * | 11/2010 | Mauceri ................ F16J 3/042 |
| | | | | 188/322.12 |
| 2006/0279031 | A1 | | 12/2006 | Schleck et al. |
| 2007/0017761 | A1 | * | 1/2007 | Huprikar ................ B60G 7/04 |
| | | | | 188/321.11 |
| 2007/0267793 | A1 | * | 11/2007 | Chamousset ........ B60G 15/068 |
| | | | | 267/220 |
| 2008/0012188 | A1 | | 1/2008 | Dickson |

FOREIGN PATENT DOCUMENTS

| | | |
|---|---|---|
| DE | 102 47 640 A1 | 4/2004 |
| EP | 0 407 360 A1 | 1/1991 |

\* cited by examiner

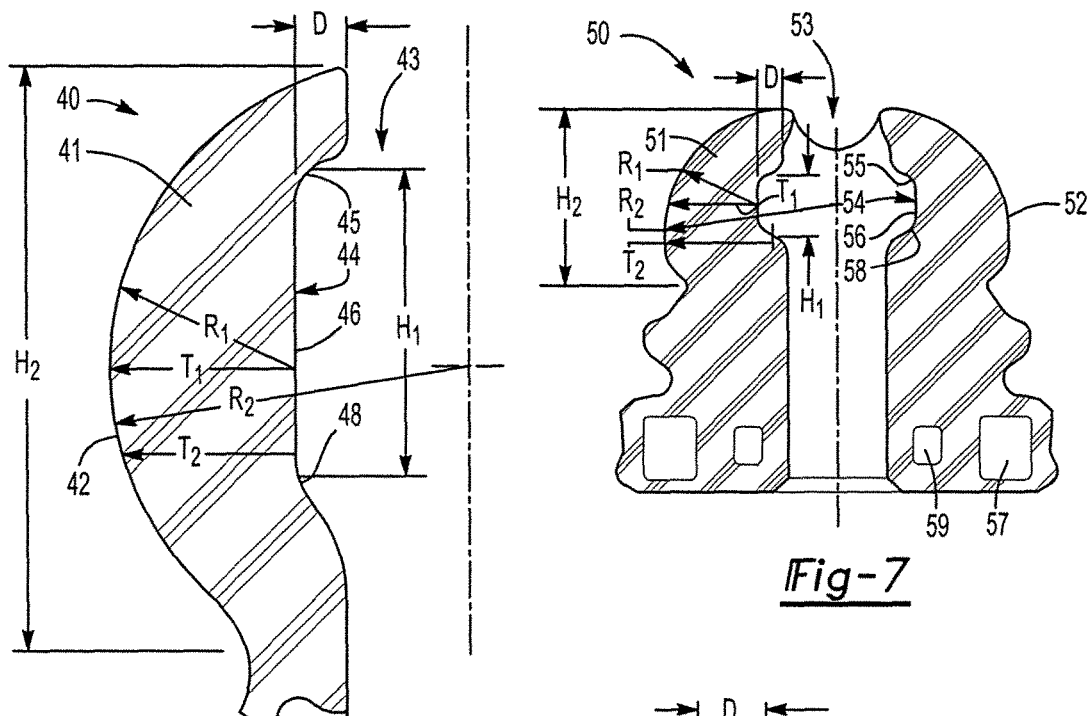
Fig-6
Fig-7
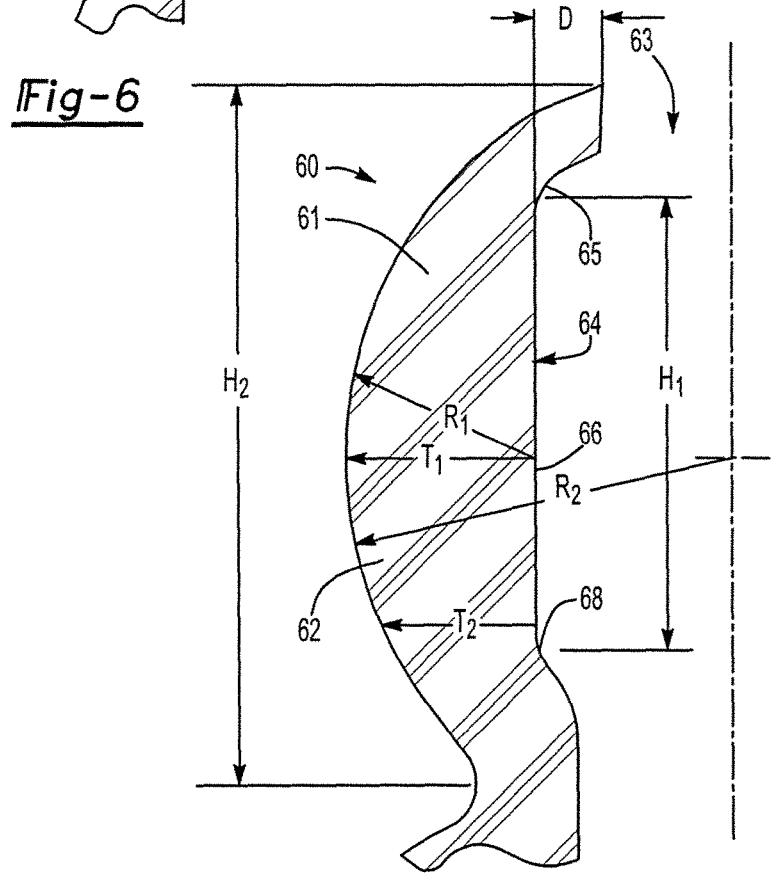
Fig-8

JOUNCE BUMPER

CROSS-REFERENCE TO RELATED APPLICATIONS

This Application claims the benefit of U.S. Provisional Application 62/119,885 filed on Feb. 24, 2015, the contents of which are incorporated herein in its entirety.

TECHNICAL FIELD

The present application related generally to jounce bumpers. More specifically, the present application relates to a jounce bumper having an improved ride and handling during operation of a vehicle.

BACKGROUND

Jounce bumpers are well known in the art and integrated into a vehicle suspension design. Jounce bumpers absorb impact and dampen noise, vibration, and harshness by preventing the articulated suspension components from fully compacting during shock impacts caused by heavy loads, potholes, curbs, or objects in the road. Jounce bumpers also act as a progressive compression spring under loads approaching full compression thereby offering a smooth ride and improved handling over a wide range of driving conditions. Previously known jounce bumpers have a generally spherical or elliptical shaped nose having an inner diameter generally matching the shape of the outer diameter of the nose. By way of example, a nose of the prior art includes an outer diameter (or surface) which is generally spherical shaped and an inner diameter mirroring the outer geometry. Accordingly, the overall thickness of the nose of the jounce bumper remains constant.

A jounce bumper of the prior art typically includes a spherical outer surface and a corresponding mirrored inner surface. The inner surface, or inner diameter, is also generally spherical. The thickness also remains constant between the outer surface and the inner surface. A derivative curve is used to assess the stiffness. FIGS. 1 and 2 illustrate the performance of the jounce bumper of the prior art. The curve of FIGS. 1 and 2 depict a dramatic dip in the curve. It is desirable to make this curve as flat as possible to improve harshness and handling.

Other versions of the prior art discloses a jounce bumper having and elliptical type outer surface and an inner surface without any undercut. The inner surface, or inner diameter, may also be generally spherical. A derivative curve is used to assess the stiffness.

Load deflection curves are commonly created to assess the spring rate of the jounce bumper during compression of the jounce bumper. A derivative curve is used to assess the stiffness. FIGS. 1 and 2 of the prior art illustrates the performance of the jounce bumper of the prior art. The curve of FIGS. 1 and 2 illustrates a dramatic dip in the curve. It is desirable to make this curve as flat as possible to improve harshness and handling and to help retain optimum steering and handling over the wide range of road effects and velocity. However, existing jounce bumpers are not able to produce a flat curve. Accordingly, there exists a need in the art to provide an improved jounce bumper providing for a generally flat stiffness curve.

SUMMARY

In one embodiment, a jounce bumper for mounting in a vehicle suspension system, where the vehicle suspension system having a shock absorber with a cylinder and a piston rod, the jounce bumper having a bore extending therethrough, the bore configured to receive the piston rod, a nose having a predetermined inner diameter and a predetermined outer diameter, the nose being generally spherical or elliptical shaped and an undercut within the jounce bumper in the bore of the jounce bumper, the undercut creating an ununiformed thickness between the predetermined inner diameter and the predetermined outer diameter so as to provide improved handling characteristics of the jounce bumper.

In some embodiments, the nose is further defined by a predetermined height, the undercut is defined by a predetermined height and where the predetermined height of the nose is greater than the predetermined height of the undercut. The jounce bumper may be made of microcellular urethane.

The undercut may include two sidewall surfaces extending into the jounce bumper to an innermost surface of the undercut. The innermost surface of the undercut may be configured to be spaced apart from the piston rod when the jounce bumper is installed around the piston rod in a use position. In some embodiments, the corner where the two sidewall surfaces meet the innermost surface of the undercut are radiused so as to create a smooth transition between the two sidewall surface and the innermost surface of the undercut.

The undercut may symmetrical on the inner surface of the bore of the jounce bumper and may generally have a rectangular cross-section.

In other embodiments, a jounce bumper for mounting in a vehicle suspension system, where the vehicle suspension system having a shock absorber with a cylinder and a piston rod, may include an elastically compressible jounce bumper having a bore extending therethrough, the bore configured to receive the piston rod where the bore has a generally cylindrical inner surface, the inner surface having an indentation extending around the inner surface so as to create a varying thickness of the jounce bumper so as to improve handling of the vehicle.

In yet another embodiment, a suspension assembly for a vehicle may include a piston rod, a cylinder extending around the piston rod and a jounce bumper where the jounce bumper includes an elastically compressible jounce bumper having a bore extending therethrough, the bore configured to receive the piston rod, a nose having a predetermined inner diameter and a predetermined outer diameter, the nose being generally spherical or elliptical shaped and an undercut within the jounce bumper in the bore of the jounce bumper, the undercut creating an ununiformed thickness between the predetermined inner diameter and the predetermined outer diameter so as to provide improved handling characteristics of the jounce bumper.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 6 depicts a cross sectional view an alternative embodiment jounce bumper according to one or more embodiments shown and described herein;

FIG. 7 depicts a halved cross sectional view a yet another alternative embodiment jounce bumper according to one or more embodiments shown and described herein;

FIG. 8 depicts a halved cross sectional view a yet another alternative embodiment jounce bumper according to one or more embodiments shown and described herein.

DETAILED DESCRIPTION OF THE PREFERRED EMBODIMENTS

The present invention provides for an improved jounce bumper having new geometry which allows lower and more consistent entry stiffness. The specific geometry, ratios, and relationships of the improved jounce bumper as compared to the prior art dramatically improves the entry stiffness performance. Accordingly, the improved jounce bumper provides for a consistent and soft entry curve thereby improving ride and handling to the user. The improved jounce bumper includes an undercut in the inner diameter (hereinafter referred to as ID).

Figure 1:
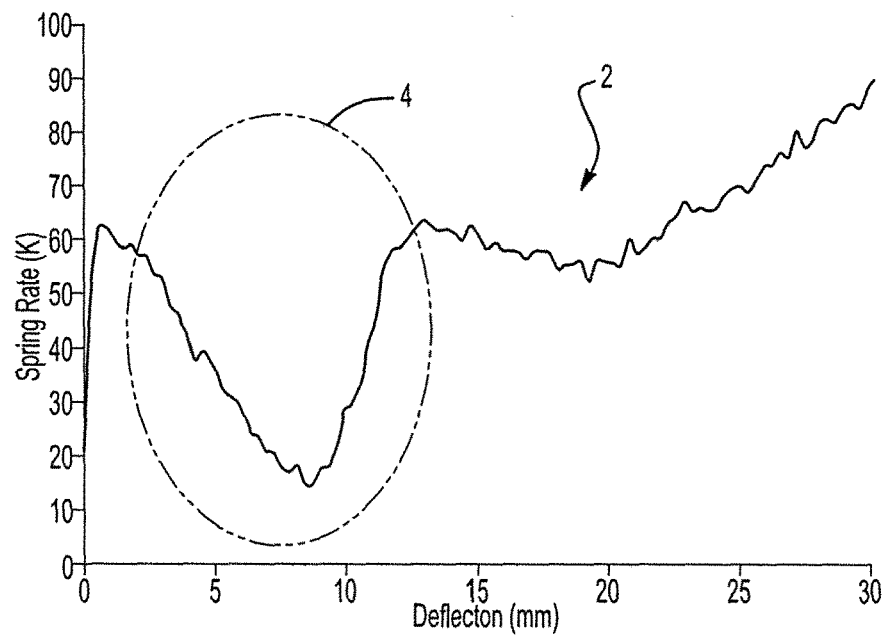
FIG. 1 depicts a stiffness curve created by a jounce bumper of the prior art.
Figure 2:
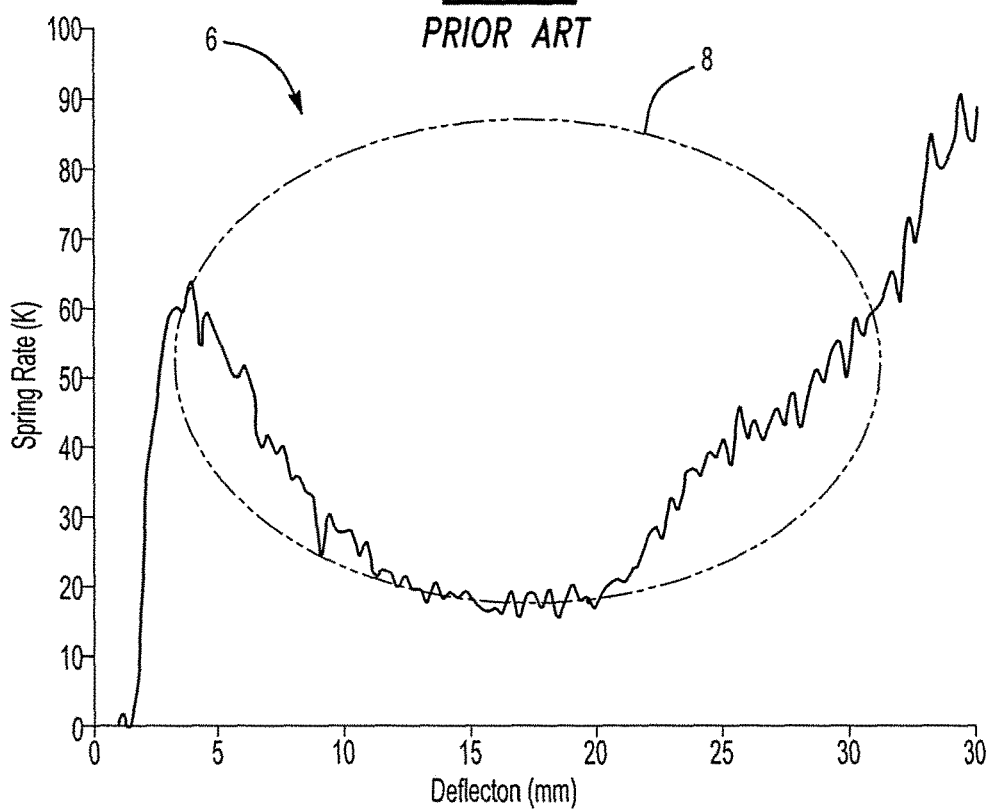
FIG. 2 depicts an additional stiffness curve created by a jounce bumper of the prior art.
Figure 3:
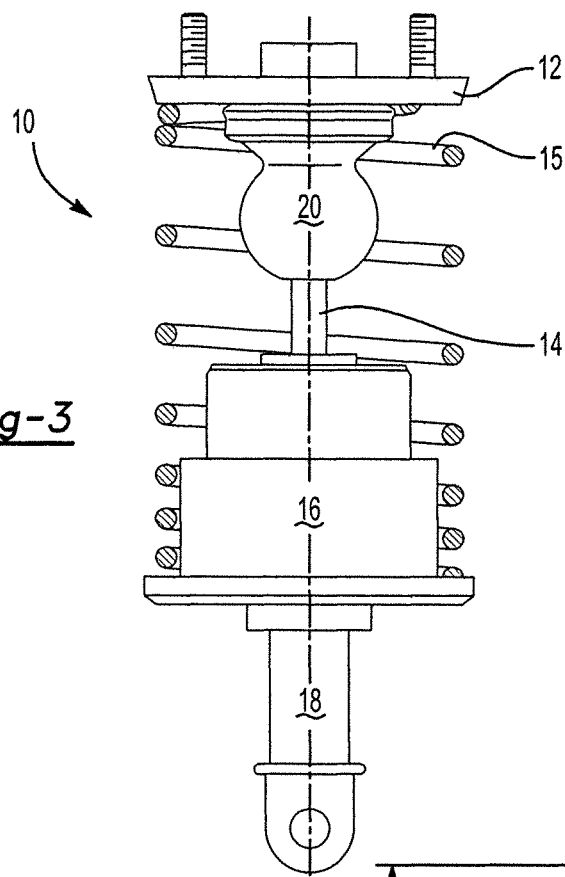
FIG. 3 depicts a jounce bumper of the present application installed on an exemplary strut assembly according to one or more embodiments shown and described herein.

FIG. 3 illustrates an exemplary assembly 10 having an upper mount 12 connected to a piston rod 14. A jounce bumper 20 (described in more detail herein) is provided around the piston rod. A cylinder 16 is provided also extending around the piston rod 14. A spring 15 may also be provided extending around the assembly including the piston rod 14 and the jounce bumper 20.

Figure 4:
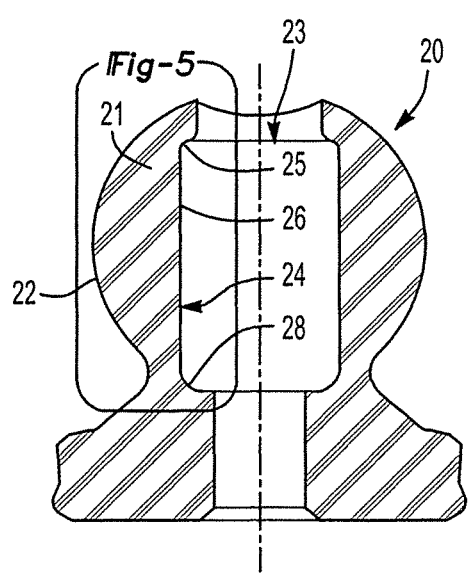
FIG. 4 depicts a cross sectional view of a jounce bumper according to one or more embodiments shown and described herein.
Figure 5:
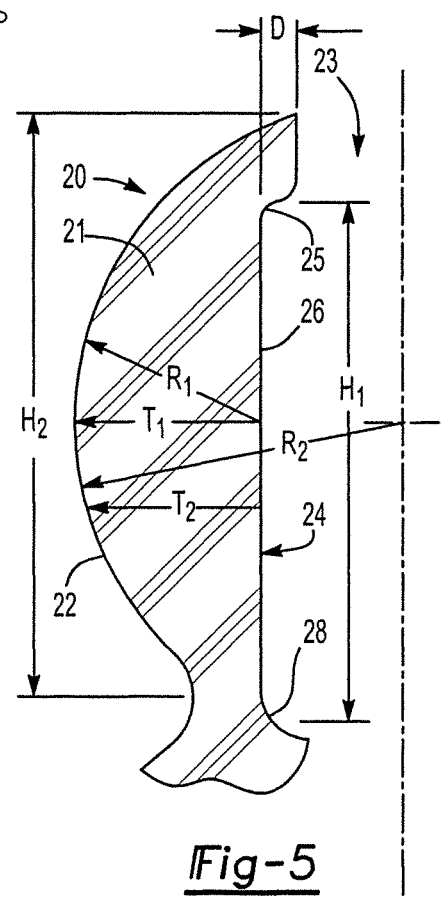
FIG. 5 depicts a halved cross sectional view of the jounce bumper of FIG. 4 according to one or more embodiments shown and described herein.

Now with reference to FIGS. 4 and 5, the present embodiment provides for a jounce bumper 20 having a generally spherical nose 21. The nose 21 includes an outer surface 22 and a corresponding inner surface 24. A bore 23 extends through the center portion of the nose 21 thereby forming the inner surface 24. The bore 21 is configured to accept the piston rod of a suspension system. The inner surface 24 includes an undercut 26 incorporated into the inner surface 24. The inner surface 24 is also referred to in the art as the inner diameter. The undercut 26 includes radiused portions 28 contributing to the overall geometry. The spherical nose 21 having the undercut 24 has a varying thickness $T_1$ which does not remain constant as illustrated by $T_2$ (also true for all embodiments here). The varying thickness is contrary to the prior art which provides for a jounce bumper of consistent thickness (if viewed at a cross section). Since the jounce bumpers of the present application have an inner surface which effectively mirrors the piston rod. In this embodiment, and all other embodiments described herein, $T_2$ is smaller than $T_1$. In other embodiments, $T_2$ is smaller than $T_1$. In all embodiments, $T_2 \neq T_1$.

The undercut 26, in the present embodiment, is generally rectangular in cross section but extending around the entire ID of the jounce bumper. The undercut 26 does not create a uniform thickness between the ID and the OD, such as in the present invention. The undercut includes a generally planar surface 24 extending along the entire ID of the bumper. Two side walls 25, 28 extend away from the surface 24 and a generally perpendicular angle. In other embodiments, the side walls 25, 28 may extend at different angles away from the surface 24.

The undercut 26 includes a height $H_1$. The nose 21 further includes a height $H_2$. In the preferred embodiment, the height $H_2$ is greater than the height $H_1$. This configuration provides for the most desirable results in the stiffness curve.

Similarly, in all embodiments, the jounce bumpers includes a first radius $R_1$ and a second radius $R_2$. The first radius $R_1$ is measured from a center portion of the undercut whereas the second radius $R_2$ is measured from the center of the bore. On the spherical shaped noses, $R_2$ remains generally constant. On the elliptical shaped noses, $R_2$ may vary more.

Further, all of the jounce bumpers having the undercuts include a depth D which can vary in dimension from 1 mm-35 mm depending on the size of the nose of the jounce bumper.

By way of example, in one embodiment, D is 4.2 mm, $H_1$ is 29.8 mm, $H_2$ is 36 mm and $T_1$ is 11.5 mm. In this embodiment, $R_1$ mm and the radiused portion is 4.2.

In other embodiments, a jounce bumper having a more elliptical configuration is provided, such as in FIG. 6. The jounce bumper of FIG. 6 depicts a nose 41 having a generally elliptical shape. A bore 43 extends through the center portion of the nose 41 thereby forming the inner surface 44. The bore 41 is configured to accept the piston rod of a suspension system. The elliptical nose 41 includes an outer surface 42 and a corresponding inner surface 44. The inner surface 44 includes an undercut 46 having a height $H_1$. The nose further includes a height $H_2$ where in the preferred embodiment the height $H_2$ is greater than the height $H_1$.

The undercut 46, in the present embodiment, is generally rectangular in cross section but extending around the entire ID of the jounce bumper. The undercut creates an varying thickness between the ID and the OD. The undercut includes a generally planar surface 44 extending along the entire ID of the bumper. Two side walls 45, 48 extend away from the surface 44 and a generally perpendicular angle. In other embodiments, the side walls 45, 48 may extend at different angles away from the surface 44.

FIG. 7 illustrates a cross-sectional view of the jounce bumper 50 having the nose 51. The undercut 56 is shown incorporated into the jounce bumper. The jounce bumper as illustrated in FIG. 7 produces the flat entry stiffness curve.

The present embodiment provides for a jounce bumper 50 having a generally spherical nose 51. The nose 51 includes an outer surface 52 and a corresponding inner surface 54. The inner surface 54 includes an undercut 56 incorporated into the inner surface 54. The inner surface 54 is also referred to in the art as the inner diameter. The undercut 54 includes radiused portions 55 contributing to the overall geometry. A bore 53 extends through the center portion of the nose 51 thereby forming the inner surface 54. The bore 51 is configured to accept the piston rod of a suspension system. The spherical nose 51 having the undercut 56 has a varying thickness $T_1$ which does not remain constant, in sharp contrast to the prior art. The thickness of all embodiments of the present application varies dramatically because of the undercuts. The varying thickness provides for a smooth curve and thus improved handling to the user.

The undercut 56, in the present embodiment, is generally rectangular in cross section but extending around the entire ID of the jounce bumper. The undercut 56 does not create a uniform thickness between the ID and the OD, such as in the present invention. The undercut includes a generally planar surface 54 extending along the entire ID of the bumper. Two side walls extend away from the surface 54 and a generally perpendicular angle. In other embodiments, the side walls may extend at different angles away from the surface 54.

The undercut 56 includes a height $H_1$. The nose 51 further includes a height $H_2$. In the preferred embodiment, the height $H_2$ is greater than the height $H_1$. This configuration provides for the most desirable results in the stiffness curve.

Now with reference to FIG. 8, a jounce bumper 60 having an alternative elliptical configuration is provided. The jounce bumper of FIG. 8 depicts a nose 61 having a generally elliptical shape. The elliptical nose 61 includes an outer surface 62 and a corresponding inner surface 64. The inner surface 64 includes an undercut 66 having a height $H_1$. A bore 63 extends through the center portion of the nose 61 thereby forming the inner surface 64. The bore 63 is configured to accept the piston rod of a suspension system. The nose further includes a height $H_2$ where in the preferred embodiment the height $H_2$ is greater than the height $H_1$.

The undercut 66, in the present embodiment, is generally rectangular in cross section but extending around the entire ID of the jounce bumper. The undercut creates an varying thickness between the ID and the OD. The undercut includes a generally planar surface 64 extending along the entire ID of the bumper. Two side walls 65, 68 extend away from the surface 64 and a generally perpendicular angle. In other embodiments, the side walls 65, 68 may extend at different angles away from the surface 64.

Figure 9:
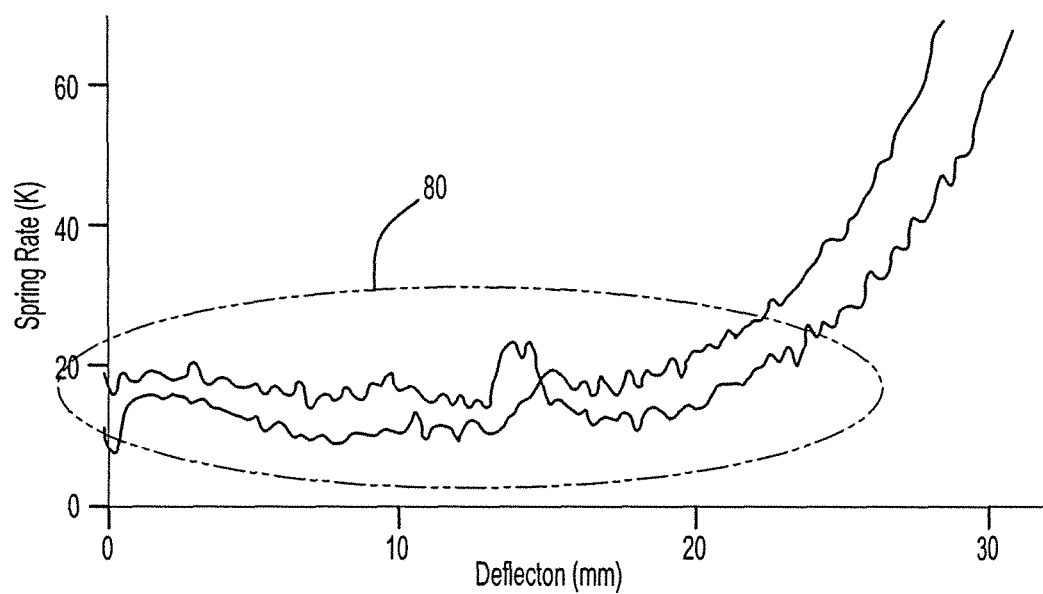
FIG. 9 depicts an exemplary stiffness curve of an elliptical jounce bumper of the embodiments as illustrated in FIGS. 3-8 having an undercut such as shown in FIGS. 3-8 according to one or more embodiments shown and described herein.

The curve as illustrated in FIG. 9 demonstrates the spring rate of the jounce bumper as the jounce bumper is compressed or deflected a corresponding amount of millimeters. During the initial compression of the jounce bumper as shown in the circle illustrated by reference numeral 80, the spring rate remains generally constant during the initial deflection and compression of the jounce bumper. The jounce bumpers described herein maintain a generally even spring rate during the first ¼ to ½ of deflection of the jounce bumper. Accordingly, the jounce bumpers of the present invention improve handling and reduce harshness felt by the user.

In the present embodiment, the jounce bumper is used in connection with a strut and corresponding coil in the suspension system. Other uses may be known such as using the jounce bumper in connection with a metal insert having an axle, specifically mounted to a frame or an axle. The jounce bumper may also be used with air spring suspension system or any other system using a jounce bumper.

In the present invention, the jounce bumper is made from a microcellular urethane (hereinafter referred to as MCU). However, the jounce bumper may be made from any elastomer such as rubber, rubber-like, plastic, plastic-like, polymer, or polymer-like material performing to the same specifications.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A jounce bumper for mounting in a vehicle suspension system, the vehicle suspension system having a shock absorber with a cylinder and a piston rod, the jounce bumper comprising:

a nose having a predetermined inner diameter and a predetermined outer diameter, the nose having a spherical or elliptical shape, the nose having an inner surface defining a bore, the bore configured to receive the piston rod, the nose having an undercut formed on the inner surface, the undercut having an innermost surface extending between two spaced apart sidewalls, the innermost surface being planar, the innermost surface parallel with the piston rod, the sidewalls connected to and extending away from the innermost surface towards the piston rod thereby forming a generally rectangular cross section, the undercut is cylindrically shaped with a uniform radius creating an ununiformed thickness between the predetermined inner diameter and the predetermined outer diameter so as to maintain a generally even spring rate and thereby providing improved handling characteristics of the jounce bumper.

2. The jounce bumper of claim 1 wherein the nose is further defined by a predetermined height, the undercut is defined by a predetermined height and where the predetermined height of the nose is greater than the predetermined height of the undercut.

3. The jounce bumper of claim 1 wherein the jounce bumper is made of microcellular urethane.

4. The jounce bumper of claim 1 wherein the innermost surface of the undercut is configured to be spaced apart from the piston rod when the jounce bumper is installed around the piston rod in a use position.

5. The jounce bumper of claim 1 wherein a corner where the two sidewall surfaces meet the innermost surface of the undercut are radiused so as to create a smooth transition between the two sidewall surfaces and the innermost surface of the undercut.

6. The jounce bumper of claim 1 wherein the undercut is symmetrical on the inner surface of the bore of the jounce bumper.

7. A jounce bumper for mounting in a vehicle suspension system, the vehicle suspension system having a shock absorber with a cylinder and a piston rod, the jounce bumper comprising:

a bore extending through the jounce bumper, the bore configured to receive the piston rod; and the bore having a generally cylindrical inner surface, the inner surface having an indentation extending around the inner surface, the indentation is rectangular in cross section across the entire length of the indentation so as to create a varying thickness of the jounce bumper so as to improve handling of the vehicle, the indentation having an innermost surface and a pair of sidewalls, the innermost surface extending between the sidewalls, the innermost surface being planar, the innermost surface parallel with the piston rod, the sidewalls connected to and extending away from the innermost surface towards the piston rod, the configuration of the undercut provided so as to maintain a generally even spring rate and thereby providing improved handling characteristics of the jounce bumper.

8. The jounce bumper of claim 7 wherein a nose is defined by a predetermined height, an undercut is defined by a predetermined height and where the predetermined height of the nose is greater than the predetermined height of the undercut.

9. The jounce bumper of claim 7 wherein the jounce bumper is made of microcellular urethane.

10. The jounce bumper of claim 7 wherein the undercut includes two sidewall surfaces extending into the jounce bumper to an innermost surface of the undercut.

11. The jounce bumper of claim 10 wherein the innermost surface of the undercut is configured to be spaced apart from the piston rod when the jounce bumper is installed around the piston rod in a use position.

12. The jounce bumper of claim 10 wherein a corner where the two sidewall surfaces meet the innermost surface of the undercut are radiused so as to create a smooth transition between the two sidewall surfaces and the innermost surface of the undercut.

13. A suspension assembly for a vehicle, the suspension assembly comprising:
 a piston rod;
 a cylinder extending around the piston rod; and
 a jounce bumper having
  a bore extending therethrough, the bore configured to receive the piston rod;
  a nose having a predetermined inner diameter and a predetermined outer diameter, the nose being generally spherical or elliptical shaped; and
  an undercut within the nose of the jounce bumper, the undercut having an innermost surface extending between two spaced apart sidewalls, the innermost surface being planar, the innermost surface parallel with the piston rod, the sidewalls connected to and extending away from the innermost surface towards the piston rod thereby forming a generally rectangular cross section, the undercut is cylindrically shaped with a uniform radius creating an ununiformed thickness between the predetermined inner diameter and the predetermined outer diameter so as to maintain a generally even spring rate and thereby providing improved handling characteristics of the jounce bumper.

14. The suspension assembly of claim 13 wherein the nose is further defined by a predetermined height, the undercut is defined by a predetermined height and where the predetermined height of the nose is greater than the predetermined height of the undercut.

15. The suspension assembly of claim 13 wherein the jounce bumper is made of microcellular urethane.

16. The suspension assembly of claim 13 wherein the innermost surface of the undercut is configured to be spaced apart from the piston rod when the jounce bumper is installed around the piston rod in a use position.

17. The suspension assembly of claim 13 wherein a corner where the two sidewall surfaces meet the innermost surface of the undercut are radiused so as to create a smooth transition between the two sidewall surfaces and the innermost surface of the undercut.

* * * * *